US009064368B2

(12) United States Patent
Englman et al.

(10) Patent No.: US 9,064,368 B2
(45) Date of Patent: Jun. 23, 2015

(54) WAGERING GAME HAVING PLAYER SELECTIONS ON TYPE OF WAGERING GAME AND GAME FEATURES APPLIED TO SELECTED WAGERING GAME

(75) Inventors: Allon G. Englman, Chicago, IL (US); Edwin Hoeks, Terneuzen (NL)

(73) Assignee: WMS Gaming Inc., Waukegan, IL (US)

( * ) Notice: Subject to any disclaimer, the term of this patent is extended or adjusted under 35 U.S.C. 154(b) by 198 days.

(21) Appl. No.: 12/726,725

(22) Filed: Mar. 18, 2010

(65) Prior Publication Data

US 2011/0230254 A1 Sep. 22, 2011

(51) Int. Cl.

*G06F 17/00* (2006.01)
*G06F 19/00* (2011.01)
*G07F 17/32* (2006.01)

(52) U.S. Cl.

CPC ............ *G07F 17/32* (2013.01); *G07F 17/3267* (2013.01); *G07F 17/3262* (2013.01)

(58) Field of Classification Search

None

See application file for complete search history.

(56) References Cited

U.S. PATENT DOCUMENTS

| | | | | |
|---|---|---|---|---|
| 6,217,448 B1 | 4/2001 | Olsen | 463/25 |
| 6,656,048 B2 | 12/2003 | Olsen | 463/25 |
| 6,843,723 B2 | 1/2005 | Joshi | 463/25 |
| 6,939,226 B1 | 9/2005 | Joshi | 463/20 |
| 6,960,136 B2 | 11/2005 | Joshi et al. | 463/25 |
| 6,974,385 B2 | 12/2005 | Joshi et al. | 463/20 |
| 6,991,543 B2 | 1/2006 | Joshi | 463/35 |
| 7,666,094 B2 | 2/2010 | Baerlocher et al. | 463/27 |
| 7,674,178 B2 | 3/2010 | Baerlocher et al. | 463/27 |
| 7,674,179 B2 | 3/2010 | Baerlocher et al. | 463/27 |
| 7,677,971 B2 | 3/2010 | Baerlocher et al. | 463/27 |
| 7,677,972 B2 | 3/2010 | Baerlocher et al. | 463/27 |
| 7,682,248 B2 | 3/2010 | Baerlocher et al. | 463/27 |
| 7,934,989 B2 | 5/2011 | Joshi et al. | 463/20 |
| 8,147,323 B2 | 4/2012 | Joshi et al. | 463/25 |
| 2001/0004607 A1 | 6/2001 | Olsen | 463/26 |
| 2004/0219968 A1* | 11/2004 | Fiden et al. | 463/20 |
| 2008/0113762 A1* | 5/2008 | Roukis | 463/20 |
| 2008/0113770 A1 | 5/2008 | Gelber et al. | 463/25 |

(Continued)

FOREIGN PATENT DOCUMENTS

| | | |
|---|---|---|
| JP | 2004-313504 A | 11/2004 |
| JP | 2009-100906 A | 5/2009 |
| WO | WO 2009061479 A1 * | 5/2009 |

OTHER PUBLICATIONS

PCT/US2008/012590, Oatman, Nov. 9, 2006, Gaming System Having Tools for Categorizing Wagers and Metering Performance of Wagering Games and SUpplemental Features.*

*Primary Examiner* — Steven J Hylinski

(74) *Attorney, Agent, or Firm* — Nixon Peabody LLP

(57) ABSTRACT

A gaming system and methods for conducting a wagering game allowing player selection of a base game and a game feature. A gaming system includes a display displaying a plurality of game icons and a plurality of game feature icons. Each of the game icons indicate a respective different base game and each of the game feature icons indicate a respective different game feature. An input device accepts a player selection of one of the plurality of game icons. The input device further accepts a player selection of one of the plurality of game feature icons. A controller selects a base game in response to the player selection of one of the plurality of game icons and selects a game feature in response to the player selection of one of the plurality of game feature icons. The controller operates the selected base game incorporating the selected game feature.

28 Claims, 8 Drawing Sheets

(56) References Cited

U.S. PATENT DOCUMENTS

| | | | | |
|---|---|---|---|---|
| 2009/0117969 | A1 | 5/2009 | Englman | 463/20 |
| 2009/0117989 | A1* | 5/2009 | Arezina et al. | 463/20 |
| 2009/0143136 | A1 | 6/2009 | Thomas et al. | 463/20 |
| 2009/0186692 | A1 | 7/2009 | Thomas et al. | 463/29 |
| 2009/0186699 | A9* | 7/2009 | Kelly | 463/42 |
| 2009/0227353 | A1* | 9/2009 | Yoshizawa | 463/20 |
| 2009/0291752 | A1 | 11/2009 | Anderson et al. | 463/25 |
| 2009/0305776 | A1 | 12/2009 | Englman et al. | 463/25 |
| 2010/0029369 | A1 | 2/2010 | Pacey | 463/20 |
| 2010/0048283 | A1 | 2/2010 | Anderson et al. | 463/20 |
| 2010/0048293 | A1 | 2/2010 | Hornik | 463/25 |
| 2010/0062841 | A1 | 3/2010 | Englman et al. | 463/25 |
| 2010/0075746 | A1 | 3/2010 | Anderson et al. | 463/25 |
| 2010/0087256 | A1 | 4/2010 | Frattinger et al. | 463/42 |
| 2010/0216544 | A1 | 8/2010 | Hamlin | 463/25 |
| 2010/0234105 | A1 | 9/2010 | Gagner et al. | 463/30 |
| 2010/0248818 | A1 | 9/2010 | Aoki et al. | 463/25 |
| 2010/0255900 | A1 | 10/2010 | Ansari et al. | 463/25 |
| 2010/0255901 | A1 | 10/2010 | Garvey et al. | 463/25 |
| 2010/0255912 | A1 | 10/2010 | Ward | 463/36 |
| 2010/0261521 | A1* | 10/2010 | Oatman et al. | 463/25 |
| 2010/0291998 | A1 | 11/2010 | Anderson et al. | 463/27 |
| 2010/0317433 | A1 | 12/2010 | Ansari et al. | 463/30 |
| 2011/0034237 | A1 | 2/2011 | Schulhof et al. | 463/25 |
| 2011/0053672 | A1 | 3/2011 | Gagner et al. | 463/16 |
| 2011/0105216 | A1* | 5/2011 | Cohen et al. | 463/20 |
| 2011/0212785 | A1 | 9/2011 | Gura et al. | 463/42 |
| 2011/0230254 | A1 | 9/2011 | Englman et al. | 463/25 |
| 2011/0250955 | A1 | 10/2011 | Adiraju et al. | 463/29 |
| 2011/0287828 | A1 | 11/2011 | Anderson et al. | 463/25 |
| 2011/0300925 | A1 | 12/2011 | Adiraju et al. | 463/25 |
| 2012/0077564 | A1 | 3/2012 | Collette et al. | 463/20 |

* cited by examiner

WAGERING GAME HAVING PLAYER SELECTIONS ON TYPE OF WAGERING GAME AND GAME FEATURES APPLIED TO SELECTED WAGERING GAME

COPYRIGHT

A portion of the disclosure of this patent document contains material which is subject to copyright protection. The copyright owner has no objection to the facsimile reproduction by anyone of the patent disclosure, as it appears in the Patent and Trademark Office patent files or records, but otherwise reserves all copyright rights whatsoever.

FIELD OF THE INVENTION

The present invention relates generally to a gaming apparatus, and methods for playing wagering games, and more particularly, to a gaming system allowing a player to select a feature from a plurality of features for application to a wagering game selected from a plurality of wagering games.

BACKGROUND OF THE INVENTION

Gaming terminals, such as slot machines, video poker machines, and the like, have been a cornerstone of the gaming industry for several years. Generally, the popularity of such machines with players is dependent on the likelihood (or perceived likelihood) of winning money at the machine and the intrinsic entertainment value of the machine relative to other available gaming options.

One attraction for players is attachment to certain games with popular themes, unique features, or the like, thereby increasing the amount of game play and therefore revenue. Gaming establishments therefore have attempted to provide the most popular games to attract players. Of course, different groups of players may have different favorite games. It is therefore desirable to provide players a choice in selecting the games they can play to maximize appeal to the greatest number of players. Rather than having multiple machines that operate different games, different games may be loaded in a single gaming terminal and a player may choose different games on the same terminal therefore saving the expense and resources of installing multiple physical gaming terminals to meet the demands of players.

A further attraction to wagering games may be special game features that may enhance awards such as bonuses, multipliers, or free spins. However, special game features are typically associated with a single type of game and cannot be transferred to another game preferred by players.

SUMMARY OF THE INVENTION

According to one example, a gaming system includes a display displaying a plurality of game icons and a plurality of game feature icons. Each of the game icons indicate a respective different base game and each of the game feature icons indicate a respective different game feature. An input device accepts a player selection of one of the plurality of game icons. The input device further accepts a player selection of one of the plurality of game feature icons. A controller selects a base game in response to the player selection of one of the plurality of game icons. The controller selects a game feature in response to the player selection of one of the plurality of game feature icons. The controller operates the selected base game incorporating the selected game feature.

Another example is a method of conducting a wagering game for a player. The wagering game includes a game sequence in which the player provides an input and a wagering game outcome is determined. A plurality of game icons and a plurality of game feature icons are displayed on a display. Each of the game icons are indicative of a respective different base game and each of the game feature icons are indicative of a respective different game feature. A player selection is accepted of one of the plurality of game icons and one of the plurality of game feature icons via an input device. A base game is selected in response to the player selection of one of the plurality of game icons. A game feature is selected in response to the player selection of one of the plurality of game feature icons. The selected base game is operated incorporating the selected base game feature.

Another example is a computer program product including a computer readable medium having an instruction set borne thereby. The instruction set is configured to cause, upon execution by a controller, the act of displaying a plurality of game icons and a plurality of game feature icons on a display. Each of the game icons are indicative of a respective different base game and each of the game feature icons are indicative of a respective different game feature. The instruction set further causes accepting, via a player input device, a player selection of one of the plurality of game icons and a player selection of one of the plurality of game feature icons via an input device. The instruction set further causes selecting a base game in response to the player selection of one of the plurality of game icons and selecting a game feature in response to the player selection of one of the plurality of game feature icons. The instruction set further causes operating the selected base game incorporating the selected base game feature.

Another example is a method of conducting a wagering game. A plurality of game icons indicating respective different base games is concurrently displayed on a display device. In response to a player's input at an input device selecting one of the game icons, the base game indicated by the selected game icon is selected. A plurality of feature icons indicating respective different features is concurrently displaying on the display. In response to a player's input at the input device selecting one of the feature icons, the feature indicated by the selected feature icon is selected. A combination of the selected base game and the selected feature is conducted.

Additional aspects will be apparent to those of ordinary skill in the art in view of the detailed description of various embodiments, which is made with reference to the drawings, a brief description of which is provided below.

Figure 1:
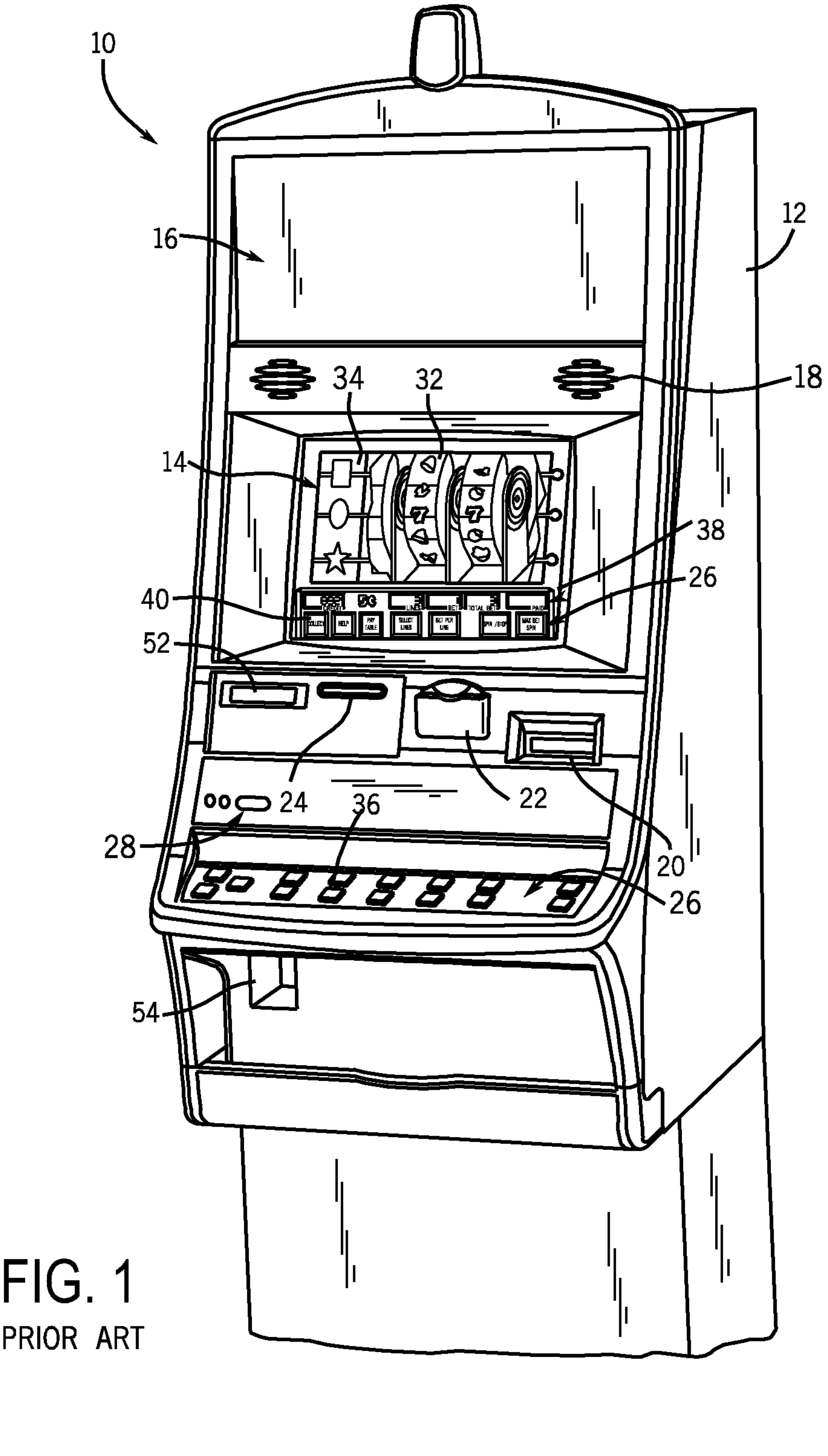
FIG. 1 PRIOR ART
FIG. 1 is a perspective view of a free-standing gaming terminal.

While the invention is susceptible to various modifications and alternative forms, specific embodiments have been shown by way of example in the drawings and will be described in detail herein. It should be understood, however, that the invention is not intended to be limited to the particular forms disclosed. Rather, the invention is to cover all modifications, equivalents, and alternatives falling within the spirit and scope of the invention as defined by the appended claims.

DETAILED DESCRIPTION

While this invention is susceptible of embodiment in many different forms, there is shown in the drawings and will herein be described in detail preferred embodiments of the invention with the understanding that the present disclosure is to be considered as an exemplification of the principles of the invention and is not intended to limit the broad aspect of the invention to the embodiments illustrated.

Referring to FIG. 1, there is shown a gaming terminal 10 similar to those used in gaming establishments, such as casinos. With regard to the present examples, the gaming terminal 10 may be any type of gaming terminal and may have varying structures and methods of operation. For example, in some aspects, the gaming terminal 10 is be an electromechanical gaming terminal configured to play mechanical slots, whereas in other aspects, the gaming terminal is an electronic gaming terminal configured to play a video casino game, such as slots, keno, poker, blackjack, roulette, craps, etc. It should be understood that although the gaming terminal 10 is shown as a free-standing terminal of the upright type, the gaming terminal is readily amenable to implementation in a wide variety of other forms such as a free-standing terminal of the slant-top type, a portable or handheld device primarily used for gaming, such as is disclosed by way of example in PCT Patent Application No. PCT/US2007/000792 filed Jan. 26, 2007, titled "Handheld Device for Wagering Games," which is incorporated herein by reference in its entirety, a mobile telecommunications device such as a mobile telephone or personal digital assistant (PDA), a counter-top or bar-top gaming terminal, or other personal electronic device, such as a portable television, MP3 player, entertainment device, etcetera.

The gaming terminal 10 illustrated in FIG. 1 comprises a cabinet or housing 12. For output devices, this embodiment of the gaming terminal 10 includes a primary display area 14, a secondary display area 16, and one or more audio speakers 18. The primary display area 14 and/or secondary display area 16 variously displays information associated with wagering games, non-wagering games, community games, progressives, advertisements, services, premium entertainment, text messaging, e-mails, alerts or announcements, broadcast information, subscription information, etc., appropriate to the particular mode(s) of operation of the gaming terminal. For input devices, the gaming terminal 10 illustrated in FIG. 1 includes a bill validator 20, a coin acceptor 22, one or more information readers 24, one or more player-input devices 26, and one or more player-accessible ports 28 (e.g., an audio output jack for headphones, a video headset jack, a wireless transmitter/receiver, etc.). While these typical components found in the gaming terminal 10 are described below, it should be understood that numerous other peripheral devices and other elements exist and are readily utilizable in any number of combinations to create various forms of a gaming terminal in accord with the present concepts.

The primary display area 14 includes, in various aspects of the present concepts, a mechanical-reel display, a video display, or a combination thereof in which a transmissive video display is disposed in front of the mechanical-reel display to portray a video image in superposition over the mechanical-reel display. Further information concerning the latter construction is disclosed in U.S. Pat. No. 6,517,433 to Loose et al. entitled "Reel Spinning Slot Machine With Superimposed Video Image," which is incorporated herein by reference in its entirety. The video display is, in various embodiments, a cathode ray tube (CRT), a high-resolution liquid crystal display (LCD), a plasma display, a light emitting diode (LED), a DLP projection display, an electroluminescent (EL) panel, or any other type of display suitable for use in the gaming terminal 10, or other form factor, such as is shown by way of example in FIG. 1. The primary display area 14 includes, in relation to many aspects of wagering games conducted on the gaming terminal 10, one or more paylines 30 (see FIG. 3) extending along a portion of the primary display area. In the illustrated embodiment of FIG. 1, the primary display area 14 comprises a plurality of mechanical reels 32 and a video display 34, such as a transmissive display (or a reflected image arrangement in other embodiments), in front of the mechanical reels 32. If the wagering game conducted via the gaming terminal 10 relies upon the video display 34 only and not the mechanical reels 32, the mechanical reels 32 are optionally removed from the interior of the terminal and the video display 34 is advantageously of a non-transmissive type. Similarly, if the wagering game conducted via the gaming terminal 10 relies only upon the mechanical reels 32, but not the video display 34, the video display 34 depicted in FIG. 1 is replaced with a conventional glass panel. Further, in still other embodiments, the video display 34 is disposed to overlay another video display, rather than a mechanical-reel display, such that the primary display area 14 includes layered or superimposed video displays. In yet other embodiments, the mechanical-reel display of the above-noted embodiments is replaced with another mechanical or physical member or members such as, but not limited to, a mechanical wheel (e.g., a roulette game), dice, a pachinko board, or a diorama presenting a three-dimensional model of a game environment.

Video images in the primary display area 14 and/or the secondary display area 16 are rendered in two-dimensional (e.g., using Flash Macromedia™) or three-dimensional graphics (e.g., using Renderware™). In various aspects, the video images are played back (e.g., from a recording stored on the gaming terminal 10), streamed (e.g., from a gaming network), or received as a TV signal (e.g., either broadcast or via cable) and such images can take different forms, such as animated images, computer-generated images, or "real-life" images, either prerecorded (e.g., in the case of marketing/promotional material) or as live footage. The format of the video images can include any format including, but not limited to, an analog format, a standard digital format, or a high-definition (HD) digital format.

The player-input or user-input device(s) 26 include, by way of example, a plurality of buttons 36 on a button panel, as shown in FIG. 1, a mouse, a joy stick, a switch, a microphone, and/or a touch screen 38 mounted over the primary display area 14 and/or the secondary display area 16 and having one or more soft touch keys 40, as is also shown in FIG. 1. In still other aspects, the player-input devices 26 comprise technologies that do not rely upon physical contact between the player and the gaming terminal, such as speech-recognition technology, gesture-sensing technology, eye-tracking technology, etc. The player-input or user-input device(s) 26 thus accept(s) player input(s) and transforms the player input(s) to electronic data signals indicative of a player input or inputs corresponding to an enabled feature for such input(s) at a time of activation (e.g., pressing a "Max Bet" button or soft key to indicate a player's desire to place a maximum wager to play the wagering game). The input(s), once transformed into electronic data signals, are output to a CPU or controller 42 (see FIG. 2) for processing. The electronic data signals are selected from a group consisting essentially of an electrical current, an electrical voltage, an electrical charge, an optical signal, an optical element, a magnetic signal, and a magnetic element.

The information reader 24 (or information reader/writer) is preferably located on the front of the housing 12 and comprises, in at least some forms, a ticket reader, card reader, bar code scanner, wireless transceiver (e.g., RFID, Bluetooth, etc.), biometric reader, or computer-readable-storage-medium interface. As noted, the information reader may comprise a physical and/or electronic writing element to permit writing to a ticket, a card, or computer-readable-storage-medium. The information reader 24 permits information to be transmitted from a portable medium (e.g., ticket, voucher, coupon, casino card, smart card, debit card, credit card, etc.) to the information reader 24 to enable the gaming terminal 10 or associated external system to access an account associated with cashless gaming, to facilitate player tracking or game customization, to retrieve a saved-game state, to store a current-game state, to cause data transfer, and/or to facilitate access to casino services, such as is more fully disclosed, by way of example, in U.S. Patent Publication No. 2003/0045354 entitled "Portable Data Unit for Communicating With Gaming Machine Over Wireless Link," which is incorporated herein by reference in its entirety. The noted account associated with cashless gaming is, in some aspects of the present concepts, stored at an external system 46 (see FIG. 2) as more fully disclosed in U.S. Pat. No. 6,280,328 to Holch, et al. entitled "Cashless Computerized Video Game System and Method," which is incorporated herein by reference in its entirety, or is alternatively stored directly on the portable storage medium. Various security protocols or features can be used to enhance security of the portable storage medium. For example, in some aspects, the individual carrying the portable storage medium is required to enter a secondary independent authenticator (e.g., password, PIN number, biometric, etc.) to access the account stored on the portable storage medium.

Figure 2:
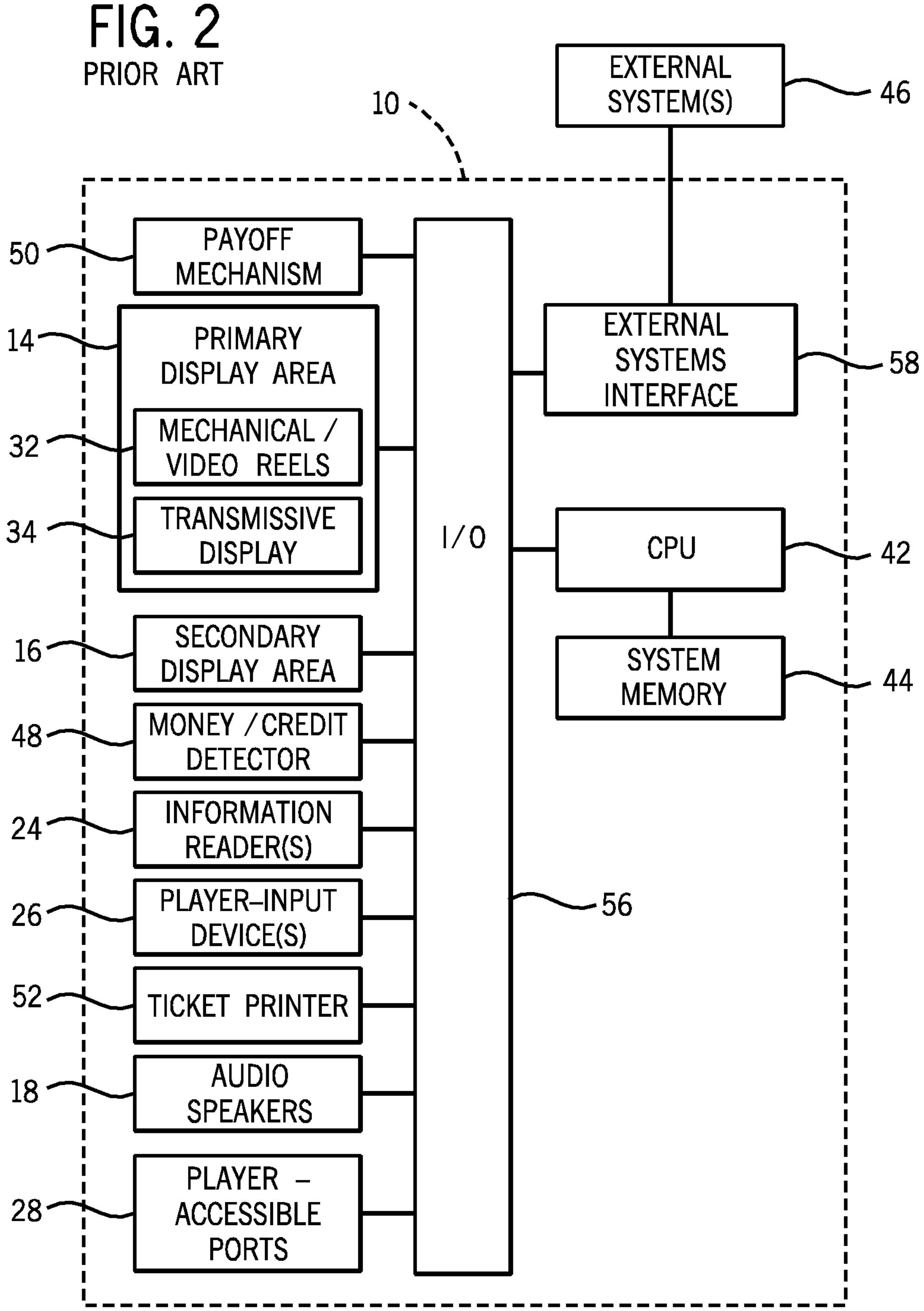
FIG. 2 PRIOR ART
FIG. 2 is a schematic view of a gaming system.

Turning now to FIG. 2, the various components of the gaming terminal 10 are controlled by one or more processors (e.g., CPU, distributed processors, etc.) 42, also referred to herein generally as a controller (e.g., microcontroller, microprocessor, etc.). The controller 42 can include any suitable processor(s), such as an Intel® Pentium processor, Intel® Core 2 Duo processor, AMD Opteron™ processor, or UltraSPARC® processor. By way of example, the controller 42 includes a plurality of microprocessors including a master processor, a slave processor, and a secondary or parallel processor. Controller 42, as used herein, comprises any combination of hardware, software, and/or firmware disposed in and/or disposed outside of the gaming terminal 10 that is configured to communicate with and/or control the transfer of data between the gaming terminal 10 and a bus, another computer, processor, or device and/or a service and/or a network. The controller 42 comprises one or more controllers or processors and such one or more controllers or processors need not be disposed proximal to one another and may be located in different devices and/or in different locations. For example, a first processor is disposed proximate a user interface device (e.g., a push button panel, a touch screen display, etc.) and a second processor is disposed remotely from the first processor, the first and second processors being electrically connected through a network. As another example, the first processor is disposed in a first enclosure (e.g., a gaming machine) and a second processor is disposed in a second enclosure (e.g., a server) separate from the first enclosure, the first and second processors being communicatively connected through a network. The controller 42 is operable to execute all of the various gaming methods and other processes disclosed herein.

To provide gaming functions, the controller 42 executes one or more game programs comprising machine-executable instructions stored in local and/or remote computer-readable data storage media (e.g., memory 44 or other suitable storage device). The term computer-readable data storage media, or "computer-readable medium," as used herein refers to any media/medium that participates in providing instructions to controller 42 for execution. The computer-readable medium comprises, in at least some exemplary forms, non-volatile media (e.g., optical disks, magnetic disks, etc.), volatile media (e.g., dynamic memory, RAM), and transmission media (e.g., coaxial cables, copper wire, fiber optics, radio frequency (RF) data communication, infrared (IR) data communication, etc). Common forms of computer-readable media include, for example, a hard disk, magnetic tape (or other magnetic medium), a 2-D or 3-D optical disc (e.g., a CD-ROM, DVD, etc.), RAM, PROM, EPROM, FLASH-EPROM, any other memory chip or solid state digital data storage device, a carrier wave, or any other medium from which a computer can read. By way of example, a plurality of storage media or devices are provided, a first storage device being disposed proximate the user interface device and a second storage device being disposed remotely from the first storage device, wherein a network is connected intermediate the first one and second one of the storage devices.

Various forms of computer-readable media may be involved in carrying one or more sequences of one or more instructions to controller 42 for execution. By way of example, the instructions may initially be borne on a data storage device of a remote device (e.g., a remote computer, server, or system). The remote device can load the instructions into its dynamic memory and send the instructions over a telephone line or other communication path using a modem or other communication device appropriate to the communication path. A modem or other communication device local to the gaming machine 10 or to an external system 46 associated with the gaming machine can receive the data on the telephone line or conveyed through the communication path (e.g., via external systems interface 58) and output the data to a bus, which transmits the data to the system memory 44 associated with the controller 42, from which system memory the processor retrieves and executes the instructions.

Thus, the controller 42 is able to send and receive data, via carrier signals, through the network(s), network link, and communication interface. The data includes, in various examples, instructions, commands, program code, player data, and game data. As to the game data, in at least some aspects of the present concepts, the controller 42 uses a local random number generator (RNG) to randomly generate a wagering game outcome from a plurality of possible outcomes. Alternatively, the outcome is centrally determined using either an RNG or pooling scheme at a remote controller included, for example, within the external system 46.

As shown in the example of FIG. 2, the controller 42 is coupled to the system memory 44. The system memory 44 is shown to comprise a volatile memory (e.g., a random-access memory (RAM)) and a non-volatile memory (e.g., an EEPROM), but optionally includes multiple RAM and multiple program memories.

As shown in the example of FIG. 2, the controller 42 is also coupled to a money/credit detector 48. The money/credit detector 48 is configured to output a signal the controller 42 that money and/or credits have been input via one or more value-input devices, such as the bill validator 20, coin acceptor 22, or via other sources, such as a cashless gaming account, etc. The value-input device(s) is integrated with the housing 12 of the gaming terminal 10 and is connected to the remainder of the components of the gaming terminal 10, as appropriate, via a wired connection, such as I/O 56, or wireless connection. The money/credit detector 48 detects the input of valid funds into the gaming terminal 10 (e.g., via currency, electronic funds, ticket, card, etc.) via the value-input device(s) and outputs a signal to the controller 42 carrying data regarding the input value of the valid funds. The controller 42 extracts the data from these signals from the money/credit detector 48, analyzes the associated data, and transforms the data corresponding to the input value into an equivalent credit balance that is available to the player for subsequent wagers on the gaming terminal 10, such transforming of the data being effected by software, hardware, and/or firmware configured to associate the input value to an equivalent credit value. Where the input value is already in a credit value form, such as in a cashless gaming account having stored therein a credit value, the wager is simply deducted from the available credit balance.

As seen in FIG. 2, the controller 42 is also connected to, and controls, the primary display area 14, the player-input device(s) 26, and a payoff mechanism 50. The payoff mechanism 50 is operable in response to instructions from the controller 42 to award a payoff to the player in response to certain winning outcomes that occur in the base game, the bonus game(s), or via an external game or event. The payoff is provided in the form of money, credits, redeemable points, advancement within a game, access to special features within a game, services, another exchangeable media, or any combination thereof. Although payoffs may be paid out in coins and/or currency bills, payoffs are alternatively associated with a coded ticket (from a ticket printer 52), a portable storage medium or device (e.g., a card magnetic strip), or are transferred to or transmitted to a designated player account. The payoff amounts distributed by the payoff mechanism 50 are determined by one or more pay tables stored in the system memory 44.

Communications between the controller 42 and both the peripheral components of the gaming terminal 10 and the external system 46 occur through input/output (I/O) circuit 56, which can include any suitable bus technologies, such as an AGTL+ frontside bus and a PCI backside bus. Although the I/O circuit 56 is shown as a single block, it should be appreciated that the I/O circuit 56 alternatively includes a number of different types of I/O circuits. Furthermore, in some embodiments, the components of the gaming terminal 10 can be interconnected according to any suitable interconnection architecture (e.g., directly connected, hypercube, etc.).

The I/O circuit 56 is connected to an external system interface or communication device 58, which is connected to the external system 46. The controller 42 communicates with the external system 46 via the external system interface 58 and a communication path (e.g., serial, parallel, IR, RC, 10 bT, near field, etc.). The external system 46 includes, in various aspects, a gaming network, other gaming terminals, a gaming server, a remote controller, communications hardware, or a variety of other interfaced systems or components, in any combination. In yet other aspects, the external system 46 may comprise a player's portable electronic device (e.g., cellular phone, electronic wallet, etc.) and the external system interface 58 is configured to facilitate wireless communication and data transfer between the portable electronic device and the controller 42, such as by a near field communication path operating via magnetic field induction or a frequency-hopping spread spectrum RF signals (e.g., Bluetooth, etc.).

The gaming terminal 10 optionally communicates with external system 46 (in a wired or wireless manner) such that each terminal operates as a "thin client" having relatively less functionality, a "thick client" having relatively more functionality, or with any range of functionality therebetween (e.g., an "intermediate client"). In general, a wagering game includes an RNG for generating a random number, game logic for determining the outcome based on the randomly generated number, and game assets (e.g., art, sound, etc.) for presenting the determined outcome to a player in an audio-visual manner. The RNG, game logic, and game assets are contained within the gaming terminal 10 ("thick client" gaming terminal), the external systems 46 ("thin client" gaming terminal), or are distributed therebetween in any suitable manner ("intermediate client" gaming terminal).

Figure 3:
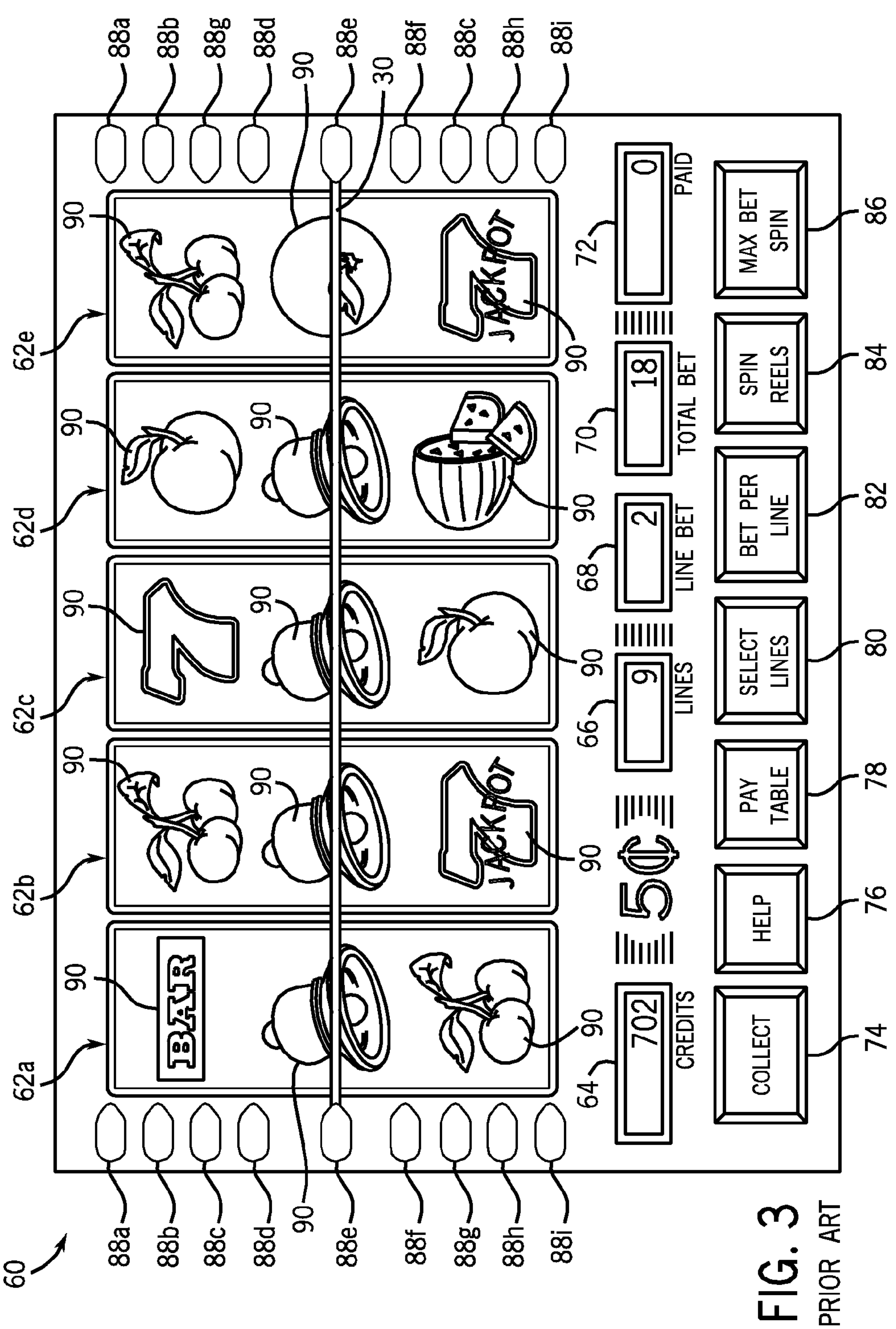
FIG. 3 PRIOR ART
FIG. 3 is an image of an exemplary base-game screen of a wagering game displayed on a gaming terminal.

Referring now to FIG. 3, an image of a basic-game screen 60 adapted to be displayed on the primary display area 14 is illustrated, according to one embodiment of the present invention. A player begins play of a basic wagering game by providing a wager. A player can operate or interact with the wagering game using the one or more player-input devices 26. The controller 42, the external system 46, or both, in alternative embodiments, operate(s) to execute a wagering game program causing the primary display area 14 to display the wagering game that includes a plurality of visual elements.

In accord with various methods of conducting a wagering game on a gaming system in accord with the present concepts, the wagering game includes a game sequence in which a player makes a wager, such as through the money/credit detector 48, touch screen 38 soft key, button panel, or the like, and a wagering game outcome is associated with the wager. The wagering game outcome is then revealed to the player in due course following initiation of the wagering game. The method comprises the acts of conducting the wagering game using a gaming apparatus, such as the gaming terminal 10 depicted in FIG. 1, following receipt of an input from the player to initiate the wagering game. The gaming terminal 10 then communicates the wagering game outcome to the player via one or more output devices (e.g., primary display 14) through the display of information such as, but not limited to, text, graphics, text and graphics, static images, moving images, etc., or any combination thereof. In accord with the method of conducting the wagering game, the controller 42, which comprises one or more processors, transforms a physical player input, such as a player's pressing of a "Spin Reels" soft key 84 (see FIG. 3), into an electronic data signal indicative of an instruction relating to the wagering game (e.g., an electronic data signal bearing data on a wager amount).

In the aforementioned method, for each data signal, the controller 42 is configured to process the electronic data signal, to interpret the data signal (e.g., data signals corresponding to a wager input), and to cause further actions associated with the interpretation of the signal in accord with computer instructions relating to such further actions executed by the controller. As one example, the controller 42 causes the recording of a digital representation of the wager in one or more storage devices (e.g., system memory 44 or a memory associated with an external system 46), the controller, in accord with associated computer instructions, causing the changing of a state of the data storage device from a first state to a second state. This change in state is, for example, effected by changing a magnetization pattern on a magnetically coated surface of a magnetic storage device or changing a magnetic state of a ferromagnetic surface of a magneto-optical disc storage device, a change in state of transistors or capacitors in a volatile or a non-volatile semiconductor memory (e.g., DRAM), etc. The noted second state of the data storage device comprises storage in the storage device of data representing the electronic data signal from the controller (e.g., the wager in the present example). As another example, the controller 42 further, in accord with the execution of the instructions relating to the wagering game, causes the primary display 14 or other display device and/or other output device (e.g., speakers, lights, communication device, etc.), to change from a first state to at least a second state, wherein the second state of the primary display comprises a visual representation of the physical player input (e.g., an acknowledgement to a player), information relating to the physical player input (e.g., an indication of the wager amount), a game sequence, an outcome of the game sequence, or any combination thereof, wherein the game sequence in accord with the present concepts comprises acts described herein. The aforementioned executing of computer instructions relating to the wagering game is further conducted in accord with a random outcome (e.g., determined by the RNG) that is used by the controller 42 to determine the outcome of the game sequence, using a game logic for determining the outcome based on the randomly generated number. In at least some aspects, the controller 42 is configured to determine an outcome of the game sequence at least partially in response to the random parameter.

The basic-game screen 60 is displayed on the primary display area 14 or a portion thereof. In FIG. 3, the basic-game screen 60 portrays a plurality of simulated movable reels 62*a-e*. Alternatively or additionally, the basic-game screen 60 portrays a plurality of mechanical reels or other video or mechanical presentation consistent with the game format and theme. The basic-game screen 60 also advantageously displays one or more game-session meters and various buttons adapted to be actuated by a player.

In the illustrated embodiment of FIG. 3, the game-session meters include a "credit" meter 64 for displaying a number of credits available for play on the terminal; a "lines" meter 66 for displaying a number of paylines to be played by a player on the terminal; a "line bet" meter 68 for displaying a number of credits wagered (e.g., from 1 to 5 or more credits) for each of the number of paylines played; a "total bet" meter 70 for displaying a total number of credits wagered for the particular round of wagering; and a "paid" meter 72 for displaying an amount to be awarded based on the results of the particular round's wager. The depicted user-selectable buttons include a "collect" button 74 to collect the credits remaining in the credits meter 64; a "help" button 76 for viewing instructions on how to play the wagering game; a "pay table" button 78 for viewing a pay table associated with the basic wagering game; a "select lines" button 80 for changing the number of paylines (displayed in the lines meter 66) a player wishes to play; a "bet per line" button 82 for changing the amount of the wager, which is displayed in the line-bet meter 68; a "spin reels" button 84 for moving the reels 62*a-e*; and a "max bet spin" button 86 for wagering a maximum number of credits and moving the reels 62*a-e* of the basic wagering game. While the gaming terminal 10 allows for these types of player inputs, the present invention does not require them and can be used on gaming terminals having more, less, or different player inputs.

As shown in the example of FIG. 3, paylines 30 extend from one of the payline indicators 88*a-i* on the left side of the basic-game screen 60 to a corresponding one of the payline indicators 88*a-i* on the right side of the screen 60. A plurality of symbols 90 is displayed on the plurality of reels 62*a-e* to indicate possible outcomes of the basic wagering game. A winning combination occurs when the displayed symbols 90 correspond to one of the winning symbol combinations listed in a pay table stored in the memory 44 of the terminal 10 or in the external system 46. The symbols 90 may include any appropriate graphical representation or animation, and may further include a "blank" symbol.

Symbol combinations are evaluated in accord with various schemes such as, but not limited to, "line pays" or "scatter pays." Line pays are evaluated left to right, right to left, top to bottom, bottom to top, or any combination thereof by evaluating the number, type, or order of symbols 90 appearing along an activated payline 30. Scatter pays are evaluated without regard to position or paylines and only require that such combination appears anywhere on the reels 62*a-e*. While an embodiment with nine paylines is shown, a wagering game with no paylines, a single payline, or any plurality of paylines will also work with the present invention. Additionally, though an embodiment with five reels is shown in FIG. 3, different embodiments of the gaming terminal 10 comprise a greater or lesser number of reels in accordance with the present invention.

Figure 4A:
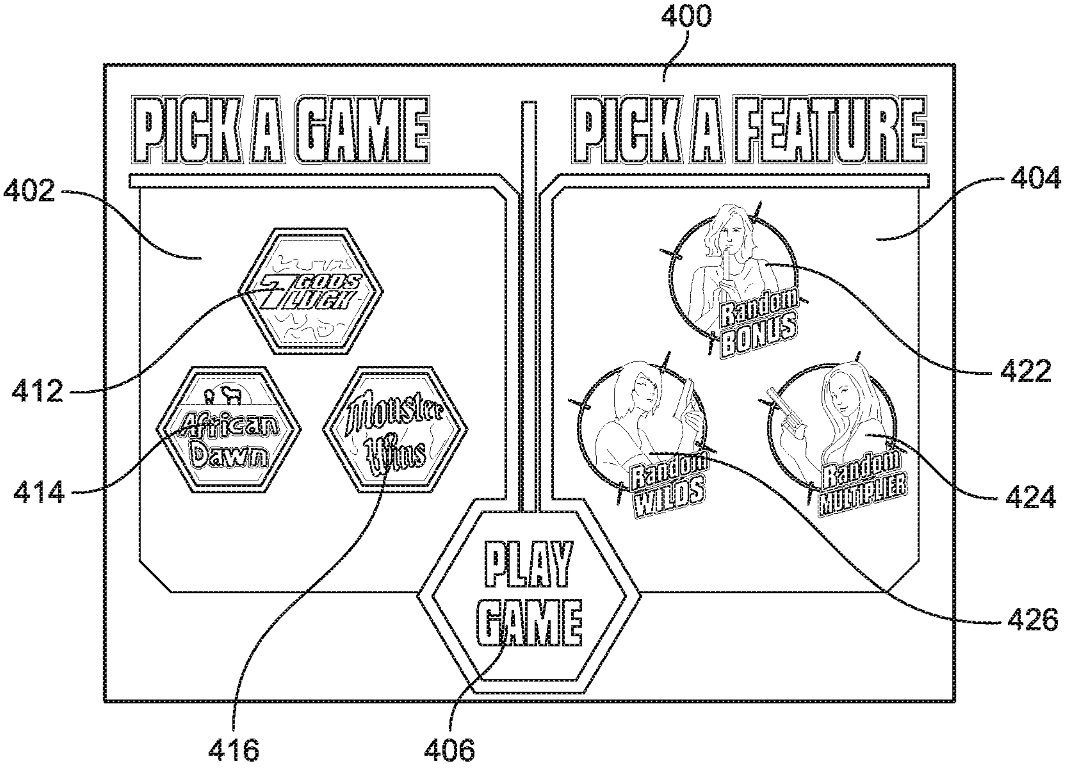
FIGS. 4A-4B are images of a selection screen displayed on a gaming terminal allowing a player to select a base game and a game feature.

Turning now to FIG. 4A, an example image of a selection screen 400 that may be displayed on a display such as the primary display area 14 in FIG. 1 is shown. The selection screen 400 includes a game selection field 402, a feature selection field 404 and a selection button 406. The game selection field 402 includes a plurality of game selection icons 412, 414, and 416 that are each indicative of a corresponding base game that may be operated by a controller such as the controller 42 in FIG. 2. In this example the game selection icon 412 is indicative of a basic game titled "7 GODS LUCK," the game selection icon 414 is indicative of a basic game titled "AFRICAN DAWN" and the game selection icon 416 is indicative of a basic game titled "MONSTER WINS." The feature selection field 404 includes a plurality of game feature icons 422, 424, and 426 that are each indicative of a different game feature. In this example, the game feature icon 422 is indicative of a random bonus game feature, the game feature icon 424 is indicative of random wilds game feature and the game feature icon 426 is indicative of a random multiplier game feature.

In this example, the display screen 400 displays the base game icons 412, 414, and 416 and the game feature icons 422, 424, and 426 simultaneously. However, the base game icons 412, 414, and 416 may be displayed in a first time period and the game feature icons 422, 424, and 426 may be displayed in a second time period distinct from the first time period. For example, the base game icons may be displayed first and the game feature icons may be displayed after a player selection of a base game icon. Alternatively, the game feature icons may be displayed and the base game icons may be displayed after the player selects one of the game feature icons.

The selection screen 400 is displayed prior to activation of a base game and allows a player to select of one of a plurality of game icons 412, 414, and 416, indicating a respective different base game and select of one of a plurality of feature icons 422, 424, and 426, indicating a respective different game feature. Both selections may be made via a player input device such as a touchscreen. A controller such as the controller 42 selects a base game in response to the player selection of one of the plurality of game icons, and selects a game feature in response to the player selection of one of the plurality of game features, and operates the selected base game. The selected base game incorporates the selected feature in response to the feature.

In this example, the selected game feature is triggered randomly without regard to the symbols appearing on the reels of the selected base game. Alternatively, the selected game feature may be triggered randomly by a symbol or symbol combination appearing on the reels of the selected base game. Once triggered, the selected game feature is conducted. If the selected game feature is the random bonus feature, the random bonus feature awards a player a random bonus such as free games, a credit award, the opportunity to play a bonus game, etc. If the selected game feature is the random wilds feature, the random wilds feature provides 1-20 wild symbols that appear in the symbols positions of the reels and substitutes for any other symbol on active paylines in the selected base game. If the selected game feature is the random multiplier feature, the random multiplier feature includes multipliers that multiply a win by a random factor between 2× and 50×. Of course, other types of game features may be offered for selection.

In operation, the player uses a player selection input device such as the touch screen in the display area 14 in FIG. 1 or another input device and selects one of the game selection icons such as the game selection icons 412, 414, and 416 by touching the area of the display area 14 corresponding to the icon. Selection of one of the game selection icons 412, 414, or 416 will cause the system to enable and operate the corresponding base game associated with the icon. The player is also prompted to select a game feature to be applied to the selected game by selecting one of the game feature icons 422, 424, or 426 indicative of a respective game feature. Selection of the game feature icons 422, 424, or 426 may also be initiated by touching the area of the display area 14 corresponding to the icon.

Figure 4B:
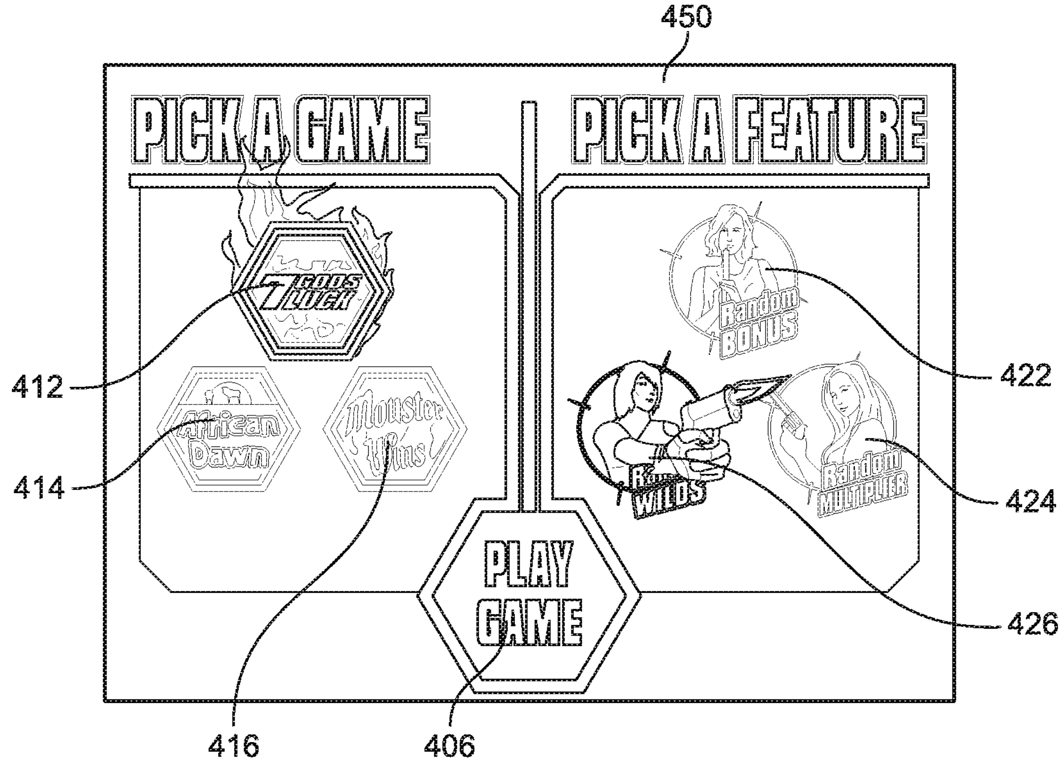

FIG. 4B is an image of a selection display screen 450 after the player has selected an icon indicative of a base game and an icon indicative of a game feature. Corresponding identical elements to FIG. 4A in FIG. 4B have identical element numbers. In this example, the player has selected the game selection icon 412 indicative of the base game titled "7 GODS OF LUCK" and selected the game feature selection icon 426 indicative of the random wilds game feature. As shown in FIG. 4B, the selected game selection icon 412 and the selected game feature icon 426 are highlighted while the other game selection icons 414 and 416 and game feature icons 422 and 424 are dimmed. The player confirms their selection by touching the play game button 406. The controller 42 will then select a base game in response to the player selection of one of the plurality of game icons 412, 414, and 416 and select a game feature in response to the player selection of one of the plurality of game feature icons 422, 424, and 426. The controller 42 will operate the selected base game, which incorporates the selected game feature in response to the selected game feature icon.

In this example, a player will place a forced wager to activate the selection of the game features. The overall wager therefore includes a base amount allocated to the base game and an additional feature wager amount allocated to the selected game feature. In this example, although the game features have different rules of play, the expected value of each of the selectable game features is substantially the same. Of course, the expected value (and therefore payback percentages) for the different game features may also be different and the forced wager may also differ depending on the selected game feature.

In this example, the base game instruction sets and the game feature instruction sets are stored in a common memory such as the system memory 44 in FIG. 2. Thus, the game features are programmed independently from the base games themselves. The individual features are therefore run from their own instruction set modules and have their own section of a mathematical model within the mathematics behind the base games. In this example, the base games are developed to stand alone with the ability to allow the features of the individual game features as an add-on to the normal base game. There may be examples where the base game includes features identical or similar to the selected features. For example, the base game may already include a random wilds game feature. In such an example, the base game instructions may be modified to activate the selected game features only if one of the similar or identical features in the base game is not activated. Thus, if the base game triggers a random wilds feature from normal base game play, the player cannot be awarded the selected game feature random wilds. If the normal base game play does not trigger a random wilds feature, the selected game feature of random wilds allows an additional opportunity of the triggering of the random wilds feature.

In this example, the math files of the base games are extended with an additional table for each possible feature for which a player must make an additional wager. An alternative is loading instructions of different variations of each base game that each incorporates a different potential selectable feature and operating the specific variation in response to the selected combination of base game and feature. In the illustrated embodiment, such alternative would result in three sets of instructions for each of the three base games, for a total of nine different sets of instructions.

Figure 5A:
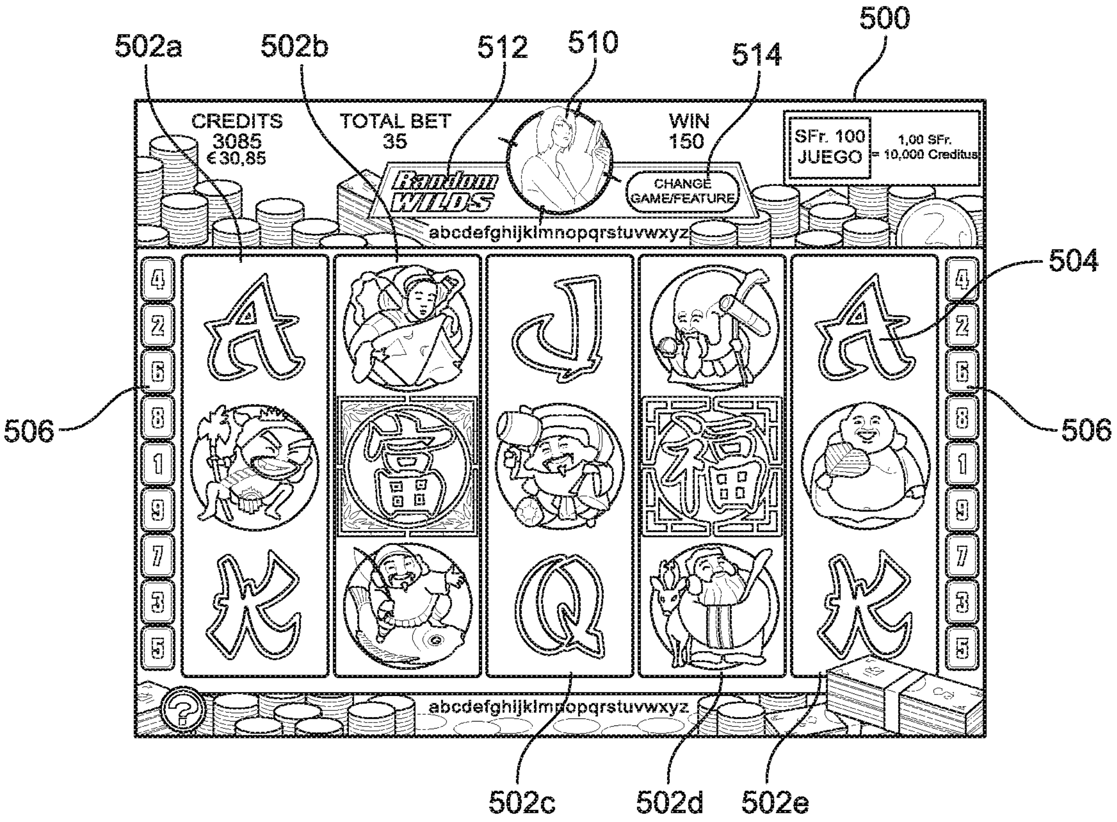
FIGS. 5A-5C are images of a selected base-game screen from FIG. 4A with a random wilds game feature selected.

FIG. 5A is an image of a selected base game screen 500 displayed on a display such as the display area 14 as a result of selection of one of the base games from the selection screen 400 in FIG. 4. The selected base game 500 in this example is the "7 GODS OF LUCK" base game selected in response to the selection of the game selection icon 412. As shown in FIG. 5A, the base game screen 500 includes a plurality of reels 502*a*-502*e* including different symbols 504. In this example, the symbols 504 may be graphically consistent with the theme of the selected base game such as the "7 GODS OF LUCK" game. Paylines 506 may be selected by a player for differing wagers. The base game screen 500 includes a game feature selection icon 510 that is identical to the selection icon 426 in FIG. 4B to indicate that the selected feature of random wilds is combined with the selected game. The game feature selection icon 510 also includes a graphic text field 512 that specifies the selected game feature. A change game/feature button 514 allows a player to change the base game and/or feature by activating the button 514 by touching the display area corresponding to the button 514. Activating the change game/feature button 514 returns the display area to the selection screen 400 shown in FIG. 4A and allows a player to change the base game or game feature.

Figure 5B:
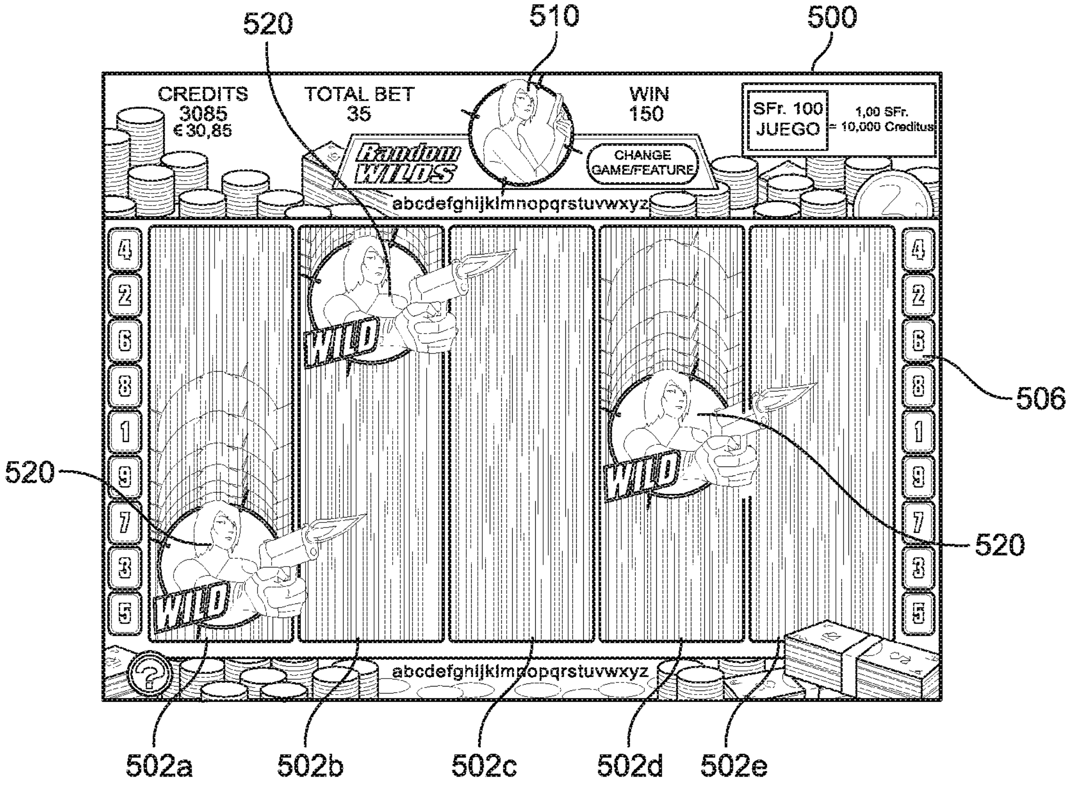

FIG. 5B is an image of the selected base game screen 500 incorporating the selected game feature. The image in FIG. 5B shows the selected base game screen 500 after a wager is accepted and the reels 502*a-e* are spinning. In this example, the random wilds game feature has been triggered and allows random wilds symbols 520 as shown in FIG. 5B to be placed on the reels 502*a-e* while the reels are spinning. When the reels 502*a-e* are stopped, the random wilds symbols 520 represent a wild symbol which becomes part of the symbols necessary for a winning outcome on any payline 506 that the random wilds symbol 520 appears.

Figure 5C:
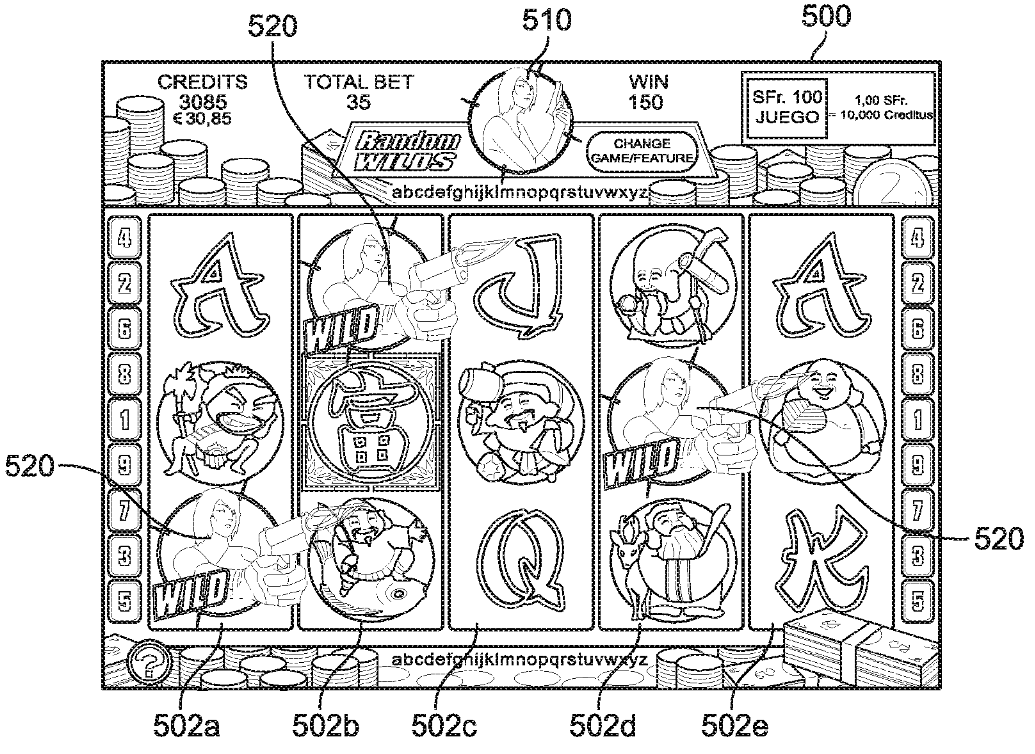

FIG. 5C is an image of the selected base game screen 500 that shows an alternate sequence of the appearance of wild symbols 520 in response to the selected random wilds game feature being activated. In this example, the wilds symbols

520 appear after the reels 502*a-e* stop spinning. As in the previous example, the random wilds symbols 520 represent wild symbols that are part of any potential winning outcome on the payline where they appear.

Figure 6:
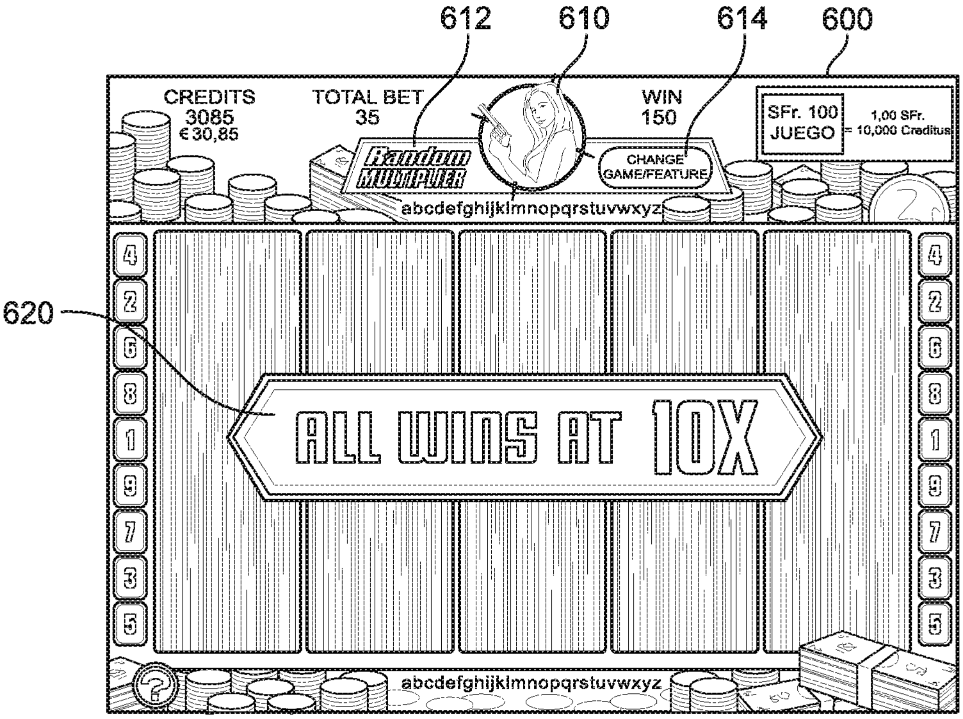
FIG. 6 is an image of a selected base-game screen from FIG. 4A with a random multiplier game feature selected.

FIG. 6 is an image of the selected base game screen 600 when the random multiplier feature is selected by the player from the selection screen 400 in FIG. 4A. In this example, the same base game has been selected as in FIGS. 5A-5C. A game feature icon 610 is displayed that is identical to the feature selection icon 424 in FIG. 4A indicating the selection of the random multiplier game feature. A text field 612 indicates that a random multiplier function has been activated. The random multiplier function causes all winning outcomes in the base game to be multiplied by a random multiplier when the game feature is triggered. In this example, a player is informed of the random multiplication via a pop-up window 620 that is shown while the reels 502*a-e* are in operation. In this example, the random multiplier is 10 times any winning amount. As in the above example, a player may change the selected game or feature by selecting the change game/feature button 614.

Figure 7:
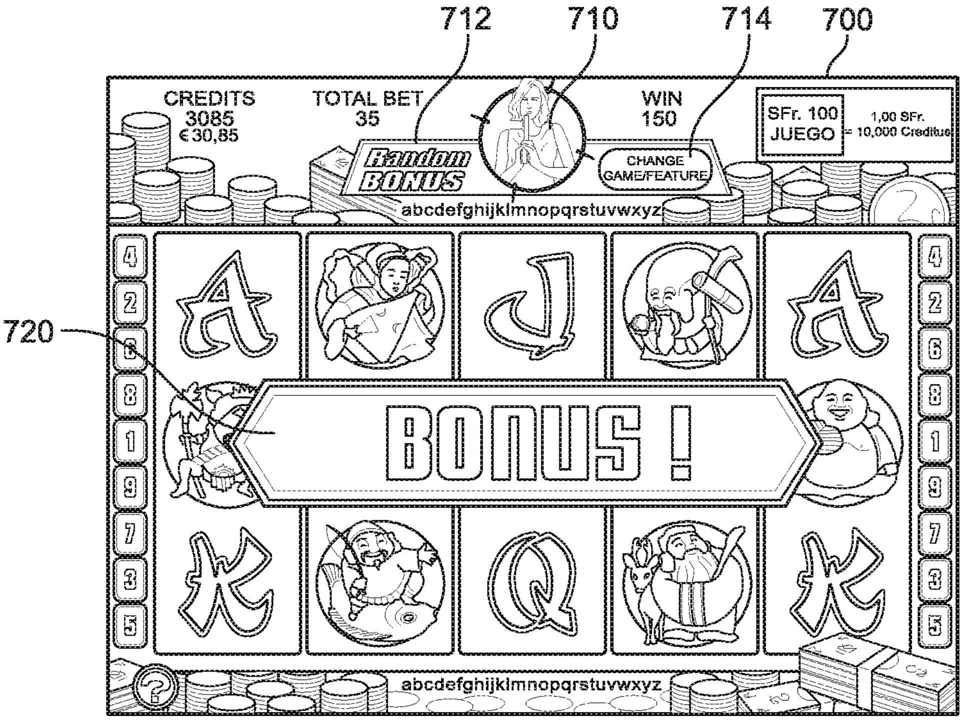
FIG. 7 is an image of a selected base-game screen from FIG. 4A with a random bonus game feature selected.

FIG. 7 is an image of a selected base game screen 700 such as the "7 GODS OF LUCK" base game where a player has selected an icon indicating the random bonus game feature from the selection screen 400 in FIG. 4A. A random bonus selection icon 710 is shown in the screen 700 and a text field 712 indicates the random bonus game feature is activated. The random bonus game feature allows the bonus feature of the selected base game to be triggered randomly in addition to any other features existing in the base game to trigger the bonus. The bonus feature may include a bonus game, free spins, credit awards, or other base game events. The selection of the random bonus game feature provides the opportunity to trigger the random bonus if one of the outcomes in the base game that normally triggers the random bonus does not trigger the bonus thereby providing the player an additional opportunity to be awarded the random bonus of the base game.

Figure 8:
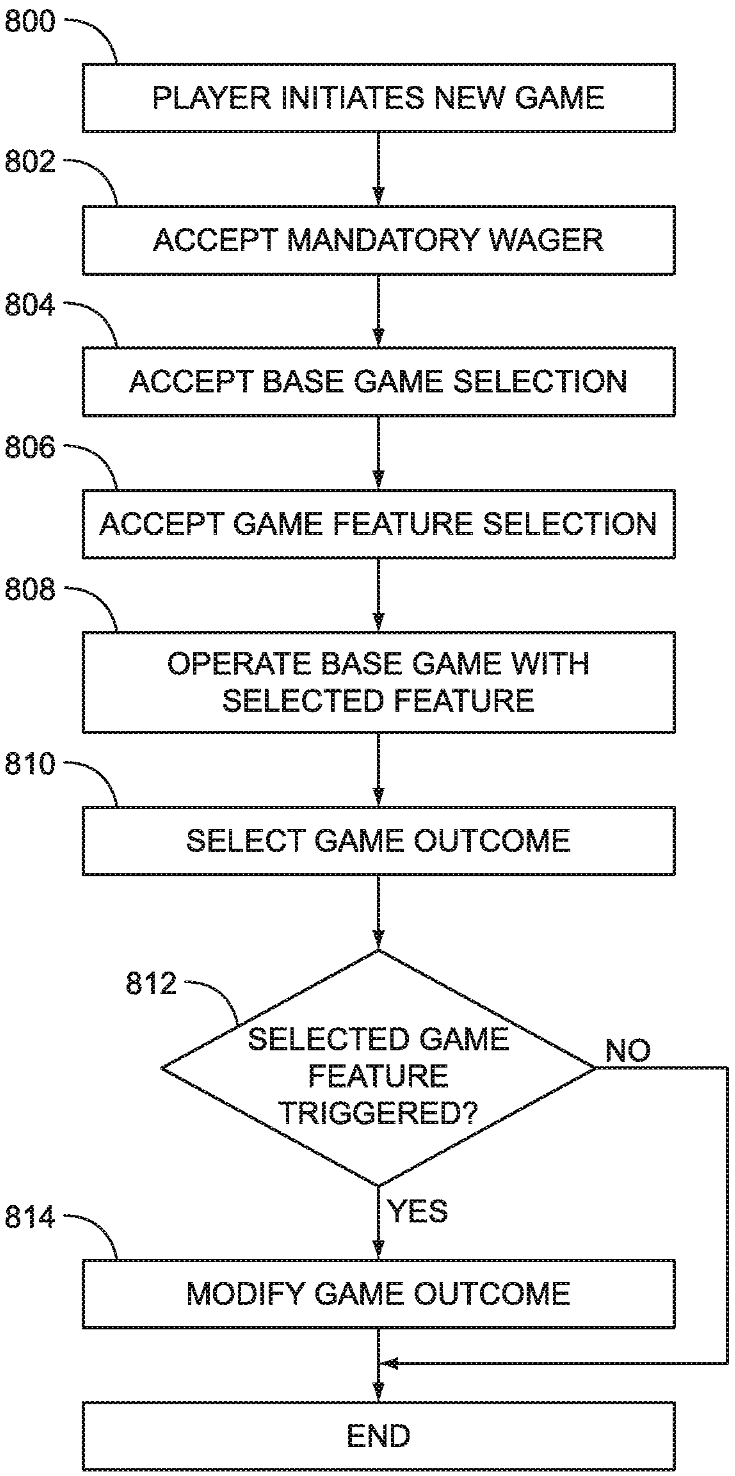
FIG. 8 is a flowchart for an algorithm that corresponds to instructions executed by a controller in accord with at least some aspects of the disclosed concepts.

FIG. 8, described by way of example above, represents one algorithm that corresponds to at least some instructions executed by the controller 42 and/or external systems 46 in FIG. 2 to perform the above described functions associated with the disclosed concepts.

The steps described below are example machine readable instructions (e.g., computer readable instructions stored on a computer readable medium) for implementing one or more methods in accordance with the examples described in the present disclosure. In one example, the machine readable instructions include an algorithm for execution by: (a) a processor, (b) a controller, and/or (c) one or more other suitable processing device(s). The algorithm can be instantiated in software stored on tangible media, for example, a flash memory, a CD-ROM, a floppy disk, a hard drive, a digital video (versatile) disk (DVD), or other memory devices, but persons of ordinary skill in the art will readily appreciate that the entire algorithm and/or parts thereof could alternatively be executed by a device other than a processor and/or embodied in firmware or in dedicated hardware in a known manner. For example, the algorithm can be implemented by an application specific integrated circuit (ASIC), a programmable logic device (PLD), a field programmable logic device (FPLD), a field programmable gate array (FPGA), discrete logic, etc. For example, any or all of the components of the direct DMA process for sharing bandwidth through a common network interface could be implemented by software executing on hardware configured to sharing bandwidth, hardware only, and/or firmware. Also, some or all of the machine readable instructions described herein can be implemented manually. Further, although various examples are described and illustrated herein, persons of ordinary skill in the art will readily appreciate that many other methods of implementing the example machine readable instructions can alternatively be used. For example, the order of execution can be changed, and/or some of the steps described can be changed, eliminated, or combined.

In FIG. 8, the player initiates a new game (800). The player then makes a mandatory wager to activate the game feature selection (802). The selection screen 400 in FIG. 4A displays a plurality of game icons and feature icons. Each of the game icons indicates a respective different base game, and each of the feature icons indicates a respective different game feature.

A player selection of one of the plurality of game icons is accepted by an input device (804). A player selection of one of the plurality of game icons is accepted by an input device (806). A base game is selected in response to the player selection of one of the plurality of game icons. A game feature is selected in response to the player selection of one of the plurality of game features. A controller such as the controller 42 operates the selected base game (808). The selected game incorporates the selected feature in response to the selected feature.

An outcome for the base game is determined (810). A determination is made whether the selected game feature is triggered (812). If the selected game feature is selected, the game outcome is modified by the feature (814) and the process ends. If the selected game feature is not triggered, the game outcome is unmodified and the process ends.

Each of these embodiments and obvious variations thereof is contemplated as falling within the spirit and scope of the claimed invention, which is set forth in the following claims.

What is claimed is:

1. A gaming system primarily dedicated to playing a casino wagering game with selectable combinations of games and game features, the system comprising:

a gaming cabinet for housing components associated with the casino wagering game;

one or more electronic display devices coupled to the gaming cabinet;

an electronic input device coupled to the gaming cabinet, the electronic input device configured to receive a physical input from a player and transform the input into an electronic data signal;

a random element generator configured to generate one or more random elements; and one or more controllers configured to:

direct at least one of the one or more electronic display devices to concurrently display, to a player, a plurality of game icons and a plurality of game feature icons, each of the game icons representing a different base game and each of the game feature icons representing a different game feature, and wherein each of the different game features is pre-configured to operate compatibly with any one of the different base games and to be randomly triggered during play of the any one base game;

receive, responsive to electronic signals from the input device, a first player selection of one of the plurality of game icons and a second player selection of one of the plurality of game feature icons;

select a base game corresponding to the selected game icon from a plurality of base games;

select a game feature corresponding to the selected game feature icon from a plurality of game features;

in response to a triggering event during play of the selected base game, wherein the selected base game includes an active game feature similar to the selected game feature, trigger the active game feature instead of the selected game feature; and in response to a triggering event during play of the selected base game, wherein the selected base game does not include an active game feature similar to the selected game feature, trigger the selected game feature.

2. The gaming system of claim 1, wherein the one or more electronic display devices include a primary and a secondary display area, and wherein one of the plurality of base game icons and the plurality of game feature icons is displayed in the primary display area and the other is displayed in the secondary display area.

3. The gaming system of claim 1, wherein at least one of the one or more electronic display devices displays a play game button that confirms the combination of the selected base game and the selected game feature.

4. The gaming system of claim 1, wherein each base game of the plurality of base games has an instruction set and each game feature of the plurality of game features has an instruction set separate from the instruction sets of the base games, and wherein the selected game feature is randomly triggered by an instruction of the instruction set of the selected base game.

5. The gaming system of claim 1, further comprising receiving an electronic signal indicative of a wager from a player, wherein the wager includes a base amount for the selected base game and an additional feature amount allocated to the selected game feature.

6. The gaming system of claim 1, wherein an icon indicative of the selected game feature is displayed on at least one of the one or more electronic display devices when the gaming system operates the selected base game incorporating the selected game feature.

7. The gaming system of claim 1, wherein each game feature of the plurality of game features has equivalent expected value.

8. The gaming system of claim 1, wherein the game features of the plurality of game features are selected from a group consisting of random multipliers, random wilds and random bonuses.

9. The gaming system of claim 1, wherein each base game of the plurality of base games has an instruction set, wherein each game feature of the plurality of game features has an instruction set separate from the instruction sets of the base games, and wherein the instructions set of each base game can access the instruction set of each game feature.

10. The gaming system of claim 1, wherein each game feature of the plurality of game features has an instruction set and each base game of the plurality of base games has an instruction set adapted to allow the instruction set of each game feature to run as an add-on, and wherein, in response to the selection of both a base game and a game feature, the instruction set of the selected game feature is connected to the instruction set of the selected base game.

11. A method of operating a gaming system primarily dedicated to playing a casino wagering game, the wagering game including selectable combinations of games and game features, the gaming system including a gaming cabinet, a random element generator, one or more controllers, one or more electronic display devices, and an electronic input device, the one or more electronic display devices and the electronic input device being coupled to the gaming cabinet, the method comprising:

concurrently displaying to a player, a plurality of game icons and a plurality of game feature icons on the one or more electronic display devices, each of the game icons representing a different base game, each of the game feature icons representing a different game feature, and wherein each of the different game features is pre-configured to operate compatibly with any one of the different base games and to be randomly triggered during play of the any one different base game;

receiving, responsive to a physical input to the electronic input device, a player selection of one of the plurality of game icons and a player selection of one of the plurality of game feature icons; and selecting, by at least one of the one or more controllers, the base game corresponding to the player selection of the one game icon;

selecting, by at least one of the one or more controllers, the game feature corresponding to the player selection of the one game feature icon;

in response to a triggering event during play of the selected base game, wherein the selected base game includes an active game feature similar to the selected game feature, triggering, by at least one of the one or more controllers, the active game feature instead of the selected game feature; and in response to a triggering event during play of the selected base game, wherein the selected base game does not include an active game feature similar to the selected game feature, triggering, by at least one of the one or more controllers, the selected game feature.

12. The method of claim 11, wherein the one or more electronic display devices includes a primary and a secondary display area, and wherein either the plurality of base game icons or the plurality of game feature icons is displayed in the primary display area and the other is displayed in the secondary display area.

13. The method of claim 11, further comprising displaying a play game button that confirms the selections of the selected base game and the selected game feature.

14. The method of claim 11, wherein each different base game has an instruction set and each different game feature has an instruction set separate from the instruction sets of the different base games, and wherein the selected game feature is randomly triggered by an instruction of the instruction set of the selected base game.

15. The method of claim 11, further comprising receiving an input indicative of a wager from the player, wherein the wager includes a base amount for the selected base game and an additional feature amount allocated to the selected game feature.

16. The method of claim 11, wherein the one or more electronic display devices display an icon indicative of the selected game feature when the one or more controllers operate the selected base game incorporating the selected game feature.

17. The method of claim 11, wherein each of the different game features has equivalent expected value.

18. The method of claim 11, wherein the different game features are selected from a group consisting of random multipliers, random wilds and random bonuses.

19. The method of claim 11, wherein each different base game has an instruction set and each different game feature has an instruction set separate from the instruction sets of the different base games, and wherein the instructions set of each different base game can access the instruction set of each different game feature.

20. The method of claim 11, wherein each different game feature has an instruction set and each different base game has an instruction set adapted to allow the instruction set of each different game feature to run as an add-on, and wherein, in response to the selection of both a base game and a game feature, the instruction set of the selected game feature is connected to the instruction set of the selected base game.

21. A computer-readable, non-transitory medium including executable instructions that, when executed by a gaming system including a gaming cabinet, a random element generator, one or more controllers, one or more electronic display devices, and an electronic input device, the one or more electronic display devices and the electronic input device being coupled to the gaming cabinet, cause the gaming system to perform a method comprising:

concurrently displaying, to a player, a plurality of game icons and a plurality of game feature icons on the one or more electronic display devices, each of the game icons representing a different base game, and each of the game feature icons representing a different game feature, and wherein each of the different game features is pre-configured to operate compatibly with any one of the different base games and to be randomly triggered during play of the any one different base game;

receiving, responsive to a physical input to the electronic input device, a player selection of one of the plurality of game icons and a player selection of one of the plurality of game feature icons; and selecting, by at least one of the one or more controllers, the base game corresponding to the player selection of the one game icon;

selecting, by at least one of the one or more controllers, the game feature corresponding to the player selection of the one game feature icon;

in response to a triggering event during play of the selected base game, wherein the selected base game includes an active game feature similar to the selected game feature, triggering, by at least one of the one or more controllers, the active game feature instead of the selected game feature; and in response to a triggering event during play of the selected base game, wherein the selected base game does not include an active game feature similar to the selected game feature, triggering, by at least one of the one or more controllers, the selected game feature.

22. The medium of claim 21, wherein the one or more electronic display devices include a primary and a secondary display area, and wherein one of the plurality of game icons and the plurality of feature icons is displayed in the primary display area and the other is displayed in the secondary display area.

23. The medium of claim 21, wherein a player's selection of a play game icon confirms the selections of the selected base game and the selected game feature.

24. The medium of claim 21, wherein each different base game has an instruction set and each different game feature has an instruction set separate from the instruction sets of the different base games, and wherein the selected game feature is randomly triggered by an instruction of the instruction set of the selected base game.

25. The medium of claim 21, wherein the method further includes receiving an input indicative of a wager from the player, the wager including a base wager amount allocated to the selected base game and a feature wager amount allocated to the selected game feature.

26. The medium of claim 21, wherein the selected game feature is displayed on at least one of the one or more electronic display devices as the selected base game is operated.

27. The medium of claim 21, wherein each different game feature has equivalent expected value.

28. A gaming machine primarily dedicated to playing a casino wagering game including selectable combinations of games and game features, the gaming machine comprising:

a gaming cabinet for housing components associated with the casino wagering game;

one or more electronic display devices coupled to the gaming cabinet and configured to display wagering game images;

an electronic input device coupled to the gaming cabinet, the electronic input device configured to receive a physical input from a player and transform the input into an electronic data signal;

a random element generator configured to generate one or more random elements, and one or more controllers configured to:

direct at least one of the one or more electronic display devices to concurrently display, to a player, a plurality of game icons and a plurality of game feature icons, each game icon of the plurality of game icons representing a different base game and each game feature icon of the plurality of game feature icons representing a different game feature, and wherein each of the plurality of game features is pre-configured to operate compatibly with any one of the different base games and to be randomly triggered during play of the any one base game;

receive selections from the player of one of the plurality of game icons and one of the plurality of game feature icons;

receive, responsive to electronic signals from the input device, a confirmation input from the player indicating the player's selections are concluded;

select the base game corresponding to the selected game icon by loading a base game instruction set from at least one memory device;

select the game feature corresponding to the selected game icon by loading a separate game feature instruction set from at least one memory device;

operate the selected base game incorporating the selected game feature by determining an outcome of the base game according to the base game instruction set and based, at least in part, on the one or more random elements;

in response to the outcome triggering the selected game feature, wherein the selected base game includes an active game feature similar to the selected game feature, trigger the active game feature instead of the selected game feature; and in response to the outcome triggering the selected game feature, wherein the selected base game does not include an active game feature similar to the selected game feature, modify the outcome according to the selected game feature instruction set.

* * * * *